United States Patent
Regev

(10) Patent No.: US 10,407,178 B2
(45) Date of Patent: Sep. 10, 2019

(54) PROPULSION SYSTEM ASSEMBLY

(71) Applicant: ISRAEL AEROSPACE INDUSTRIES LTD., Lod (IL)

(72) Inventor: Eyal Regev, Mazkeret Batya (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 175 days.

(21) Appl. No.: 15/501,318

(22) PCT Filed: Jul. 29, 2015

(86) PCT No.: PCT/IL2015/050777
§ 371 (c)(1),
(2) Date: Feb. 2, 2017

(87) PCT Pub. No.: WO2016/020915
PCT Pub. Date: Feb. 11, 2016

(65) Prior Publication Data
US 2017/0217600 A1 Aug. 3, 2017

(30) Foreign Application Priority Data
Aug. 4, 2014 (IL) .......................................... 233942

(51) Int. Cl.
*H02K 7/20* (2006.01)
*B64D 35/02* (2006.01)
(Continued)

(52) U.S. Cl.
CPC ............... *B64D 35/02* (2013.01); *B64C 15/00* (2013.01); *B64C 27/14* (2013.01); *B64D 27/24* (2013.01);
(Continued)

(58) Field of Classification Search
CPC ................................. H02K 16/00; B64C 27/14
(Continued)

(56) References Cited

U.S. PATENT DOCUMENTS

| 661,335 A | 11/1900 | Cryder |
| 5,917,257 A | 6/1999 | Taghezout |

(Continued)

FOREIGN PATENT DOCUMENTS

| DE | 2 134 667 A1 | 1/1973 |
| EP | 2 688 184 A1 | 1/2014 |

(Continued)

*Primary Examiner* — Hanh N Nguyen
(74) *Attorney, Agent, or Firm* — Vorys, Sater, Seymour & Pease LLP

(57) ABSTRACT

A propulsion system assembly is provided including a driveshaft and a plurality of electric motor modules. The driveshaft is rotatably mounted to a casing about a drive axis, the driveshaft including a first shaft end and an opposite facing second shaft end. The plurality of electric motor modules are in axially stacked relationship with one another with respect to the drive axis to define an electric motor module stack, each electric motor module being configured for transmitting a torque to the driveshaft when coupled thereto independently of at least one other electric motor module. Each electric motor module includes a controllable clutch arrangement for selectively coupling and decoupling the respective electric motor module with respect to the driveshaft to respectively enable and disable transmission of torque between the respective electric motor module and the driveshaft.

21 Claims, 8 Drawing Sheets

(51) Int. Cl.
  *H02K 16/00* (2006.01)
  *B64C 15/00* (2006.01)
  *B64D 27/24* (2006.01)
  *H02K 7/10* (2006.01)
  *B64C 27/14* (2006.01)
  *H02K 21/24* (2006.01)
  *H02K 7/108* (2006.01)
  *B60L 50/15* (2019.01)

(52) U.S. Cl.
  CPC ............... *H02K 7/10* (2013.01); *H02K 16/00* (2013.01); *B60L 50/15* (2019.02); *B64C 2201/042* (2013.01); *B64C 2201/165* (2013.01); *H02K 7/108* (2013.01); *H02K 21/24* (2013.01); *H02K 2213/12* (2013.01); *Y02T 50/44* (2013.01); *Y02T 50/62* (2013.01)

(58) Field of Classification Search
  USPC .......................................... 310/112, 113, 114
  See application file for complete search history.

(56) References Cited

U.S. PATENT DOCUMENTS

| | | | |
|---|---|---|---|
| 6,293,491 | B1 | 9/2001 | Wobben |
| 6,713,982 | B2 | 3/2004 | Burse |
| 7,377,876 | B2 | 5/2008 | Yang |
| 7,906,925 | B2 | 3/2011 | Takeuchi |
| 8,183,729 | B2 * | 5/2012 | Takeuchi ............. H02K 15/026 310/114 |
| 8,288,916 | B2 | 10/2012 | Quere |
| 8,317,126 | B2 | 11/2012 | Harris et al. |
| 8,643,238 | B2 * | 2/2014 | Ling ..................... H02K 53/00 310/113 |
| 2005/0061910 | A1 | 3/2005 | Wobben |
| 2005/0161268 | A1 | 7/2005 | Yang |
| 2005/0269887 | A1 * | 12/2005 | Blanding ................ B64C 13/00 310/112 |
| 2006/0266881 | A1 | 11/2006 | Hughey |
| 2008/0006739 | A1 | 1/2008 | Mochida et al. |
| 2009/0140095 | A1 | 6/2009 | Sirohi et al. |
| 2010/0019593 | A1 | 1/2010 | Ritchey |
| 2010/0025526 | A1 | 2/2010 | Lawrence |
| 2010/0253168 | A1 | 10/2010 | Herrmann |
| 2011/0017865 | A1 | 1/2011 | Achtelik et al. |
| 2012/0091284 | A1 | 4/2012 | Goodarzi |
| 2012/0125368 | A1 | 5/2012 | Kaneko et al. |
| 2013/0020429 | A1 | 1/2013 | Kroo |
| 2013/0092799 | A1 | 4/2013 | Tian et al. |
| 2013/0119185 | A1 | 5/2013 | Botti et al. |
| 2013/0231208 | A1 | 9/2013 | Buono et al. |
| 2014/0203739 | A1 | 7/2014 | Chantriaux et al. |
| 2014/0248168 | A1 * | 9/2014 | Chantriaux ............ B64C 27/14 417/410.1 |
| 2016/0329777 | A1 | 11/2016 | Mariotto |

FOREIGN PATENT DOCUMENTS

| | | |
|---|---|---|
| GB | 190708367 A | 4/1908 |
| RU | 2008 111 037 A | 9/2009 |
| WO | 2010/071779 A1 | 6/2010 |
| WO | 2011/107718 A1 | 9/2011 |
| WO | 2012/035025 A2 | 3/2012 |
| WO | 2013/124300 A1 | 8/2013 |
| WO | 2014/021798 A2 | 2/2014 |
| WO | 2014/033715 A1 | 3/2014 |
| WO | 2014/033716 A1 | 3/2014 |

* cited by examiner

PROPULSION SYSTEM ASSEMBLY

TECHNOLOGICAL FIELD

The presently disclose subject matter relates to propulsion systems, in particular for powering air vehicles.

BACKGROUND ART

References considered to be relevant as background to the presently disclosed subject matter are listed below:
U.S. Pat. No. 8,317,126
U.S. Pat. No. 8,288,916
U.S. Pat. No. 7,906,925
U.S. Pat. No. 7,377,876
U.S. Pat. No. 6,713,982
US 2010/253168
US 2008/006739
WO 2011/107718
WO 2010/071779
WO 2014/033715
WO 2014/033716
DE 2134667

Acknowledgement of the above references herein is not to be inferred as meaning that these are in any way relevant to the patentability of the presently disclosed subject matter.

BACKGROUND

There are many classes of air vehicles that use one or more propulsion system for conventional aerodynamic flight and/or for vectored flight.

In at least some cases, electrically powered motors are used for powering the air vehicle and in any case the power requirements can vary significantly for different operating conditions as well as for different air vehicle designs.

For example, in at least some cases, for air vehicles in the vertical take-off and landing (VTOL) category, the power requirements for vectored flight, including vertical take-off (VTO), vertical landing (VL) and hover, are much higher, for example seven times higher, than the power requirements for aerodynamic flight.

It is known that when operating a VTOL type air vehicle in vectored thrust mode, using a propulsion system including a combination of "n" rotors (where "n" is an integer greater than 1), conventionally there often exists what is known as a "dead man's curve". This refers to a situation in which a problem can occur in the propulsion system in some stages of the vectored thrust flight that can result in an uncontrolled crash of the air vehicle. Such a situation is more dangerous in air vehicles that do not have helicopter type rotors that can otherwise mitigate the danger by providing the air vehicle with some gliding characteristics. In such helicopter type propulsion systems, some measure of gliding can be provided by the forced auto-rotation of the rotor, increasing the chances of survival of the air vehicle. An alternative approach to survivability in case of propulsion system failure in other types of VTOL type air vehicles (and sometimes implemented as an additional safety feature in some helicopters) is to provide redundancy in the thrust generation capability, and while several ways are known for creating the redundancy required to overcome this problem, conventionally this comes with a reduction in performance and a significant increase in cost of ownership.

It is also known that when designing an air vehicle, the requirements often change during the development stage and/or during the operational life cycle of the air vehicle. Such changes can arise, for example, from an increasing demand one or more of: payload weight, endurance and range. Correspondingly, the power demands on the propulsion system also need to change. Conventionally, such changes are sometimes achieved by redesigning the propulsion system to meet the new needs, though this solution can often require costly investment in time, effort and resources to implement.

General Description

According to a first aspect of the presently disclose subject matter there is provided a propulsion system assembly comprising:
  a driveshaft rotatably mounted to a casing about a drive axis, the driveshaft comprising a first shaft end and an opposite facing second shaft end;
  a plurality of electric motor modules in axially stacked relationship with one another with respect to the drive axis to define an electric motor module stack, said plurality being an integer greater than unity, each electric motor module being configured for transmitting a torque to the driveshaft when coupled thereto independently of at least one other said electric motor module;
  each electric motor module comprising a controllable clutch arrangement for selectively coupling and decoupling the respective electric motor module with respect to the driveshaft to respectively enable and disable transmission of torque between the respective electric motor module and the driveshaft.

For example, each said electric motor module comprises:
  a stator element;
  a rotor element rotatably mounted with respect to the stator element, and configured for being reversibly coupled to the drive shaft via the respective clutch arrangement.

For example, each electric motor module has a depth dimension parallel to the drive axis and a width dimension orthogonal to the drive axis, wherein said width dimension is greater than said depth dimension. For example, a ratio of said width dimension to said depth dimension is between 5 and 20. For example, a ratio of said width dimension to said depth dimension is greater than 10.

For example, each said electrical motor module is design to generate the same torque under the same operating conditions as one another.

For example, each said electrical motor module is design to generate a module design shaft power of 40 kW, or more than 40 kW, or less than 40 kW.

For example, said propulsion system assembly is configured to provide a design shaft power using all said electric motor modules, wherein said design shaft power is greater than a required shaft power by a shaft power safety margin, wherein said shaft power safety margin is not less than a module design shaft power of at least one said electric motor module.

For example, for each electric motor module, the respective clutch arrangement comprises an electromechanical clutch independently actuable with respect to the other said clutch arrangements.

For example, for each electric motor module, the respective clutch arrangement comprises:
  a clutch rotor and a field coil concentrically provided on the rotor element, and
  an armature affixed to the driveshaft
  wherein responsive to actuation of the respective clutch arrangement the clutch rotor frictionally abuts the armature driveshaft to enable transmission of said torque between the respective electric motor module and the driveshaft.

For example, for each electric motor module, the respective clutch arrangement is actuable responsive to one or more of electric, electronic or digital signals.

For example, for each electric motor module, the respective clutch arrangement comprises an electromagnetic clutch independently actuable with respect to the other said clutch arrangements.

For example, for each electric motor module, the respective clutch arrangement comprises a mechanical clutch independently actuable with respect to the other said clutch arrangements.

For example, for each electric motor module, the respective clutch arrangement is actuable responsive to the clutch arrangement being subjected to a rotational resistance from the respective electric motor module greater than a predetermined threshold.

For example, the propulsion system assembly further comprising a first rotor element for aerodynamically generating a first thrust responsive to being turned about said drive axis by the propulsion system assembly. For example, said first rotor element is affixed to said first shaft end. For example, said first rotor element comprises any one of a propeller, ducted fan, unducted fan.

In some examples, the first rotor can be mounted to the driveshaft at a position intercalated between two otherwise adjacent said electric motor modules.

For example, the propulsion system assembly further comprises a second rotor element for aerodynamically generating a second thrust responsive to being turned about said drive axis by the propulsion system assembly. For example, said second rotor element is affixed to said second shaft end. For example, said second rotor element comprises any one of a propeller, ducted fan, unducted fan.

For example, the casing comprising a first casing bracket affixed to a first said electric motor module that is closest to said first shaft end, and a second casing bracket affixed to a second said electric motor module that is closest to said second shaft end, said first casing bracket comprising a first bearing arrangement and said second casing bracket comprising a second bearing arrangement, the driveshaft being rotatably mounted with respect to said first bearing arrangement and said second bearing arrangement.

For example, in said axially stacked relationship, each pair of axially adjacent said electric motor modules are fixedly connected to one another.

For example, said electric motor modules are connected to the casing in fixed spatial relationship in said axially stacked relationship.

For example, said casing comprises a plurality of spacer elements interconnecting each pair of axially adjacent electric motor modules in fixed spatial relationship in said axially stacked relationship.

For example, the propulsion system assembly further comprises a housing member for enclosing therein at least said casing and said plurality of electric motor modules. For example, said housing member is configured for pivoting about a pivot axis different from the drive axis. For example, said pivot axis is orthogonal to the drive axis.

For example, the propulsion system assembly further comprises a control system for controlling operation of each said electric motor module.

For example, said control system comprises a motor controller for each said electric motor module, each respective motor controller being configured for operating the respective said clutch arrangement, wherein to cause the respective said clutch arrangement to selectively couple and decouple the respective said electric motor module with respect to the driveshaft.

For example, each said motor controller is configured for operating the respective said clutch arrangement to decouple the respective said electric motor module with respect to the driveshaft responsive to a detectable fault being detected in the respective said electric motor module.

For example, said detectable fault comprises a significant reduction in the shaft power generated by the respective said electric motor module as compared with an expected shaft power level.

For example, the control system comprises a detector for detecting said detectable fault, said detector being operatively connected to the control system.

For example, said detector comprises at least one of Hall effect Sensors, Encoders, Resolvers.

For example, each said motor controller is configured for operating independently of at least one other said motor controller.

For example, said control system comprises a master controller for controlling operation of the plurality of said motor controllers corresponding to said plurality of electric motor modules.

According to a second aspect of the presently disclose subject matter there is provided an air vehicle comprising at least one propulsion system assembly as defined herein regarding the first aspect of the presently disclose subject matter.

For example, the air vehicle is a VTOL type air vehicle.

For example, the air vehicle is a manned air vehicle.

For example, the air vehicle is an unmanned air vehicle (UAV).

For example, said propulsion system assembly configured for selectively providing vertical thrust for vectored thrust flight and for selectively changing the thrust vector to provide horizontal thrust for aerodynamic flight.

For example, at least one said propulsion system assembly is reversibly tiltable between a horizontal angular disposition for providing horizontal thrust and a vertical angular disposition for providing vertical thrust.

For example, the air vehicle comprises three said propulsion system assemblies.

For example, said three propulsion system assemblies are in triangular configuration when viewed in plan view.

For example, the air vehicle can be a fixed-wing vehicle.

For example, the air vehicle can be a rotary wing vehicle, for example a helicopter.

According to a third aspect of the presently disclose subject matter there is provided a method for operating an air vehicle, comprising:

providing a shaft power requirement for driving a desired rotor at desired operating conditions;

providing a propulsion system assembly as defined herein regarding the first aspect of the presently disclose subject matter, wherein each said electric motor module is designed to provide a module shaft power output at said desired operating conditions, wherein said integer is chosen such that a shaft power output of the stack, defined as a product of said integer and said module shaft power output, matches or exceeds said shaft power requirement.

For example, the method comprises modifying said shaft power requirement and correspondingly modifying said integer by increasing or decreasing said plurality of said electric motor modules such that a modified product of said modified integer and said module shaft power output matches or exceeds said modified shaft power requirement.

For example, the method comprises adding additional said electric motor modules to said electric motor module stack to thereby increase said shaft power output of the thus modified propulsion system assembly as compared with the unmodified said propulsion system assembly.

For example, the method comprises removing at least one said electric motor modules from said electric motor module stack to thereby decrease said shaft power output of the thus modified propulsion system assembly as compared with the unmodified said propulsion system assembly.

For example, the method comprises monitoring operation of each said electric motor module and operating the respective said clutch arrangement thereof to decouple the respective said electric motor module from the driveshaft responsive to a detectable fault being detected in operation of the respective said electric motor module.

For example, the shaft power requirement is determined for vectored thrust flight, and further comprising operating the propulsion system assembly in aerodynamic flight with a reduced number of electric motor modules coupled to the driveshaft, said reduced number being at least one less than said integer.

For example, each said electric motor module of said reduced number of electric motor modules operates at maximum efficiency during said aerodynamic flight.

For example, a ratio of said integer to said reduced number is between 5 and 10.

According to a fourth aspect of the presently disclosed subject matter there is provided an electric motor module, comprising
  a stator element;
  a rotor element rotatably mounted with respect to the stator element,
    a controllable clutch arrangement for selectively coupling and decoupling the electric motor module with respect to a driveshaft to respectively enable and disable transmission of torque between the electric motor module and the driveshaft.

For example, the clutch arrangement comprises an independently actuable electromechanical clutch.

For example, the clutch arrangement comprises:
  a clutch rotor and a field coil concentrically provided on the rotor element, and
  an armature affixed to the driveshaft
  wherein responsive to actuation of the respective clutch arrangement the clutch rotor frictionally abuts the armature driveshaft to enable transmission of said torque between the respective electric motor module and the driveshaft.

For example, the clutch arrangement is actuable responsive to one or more of electric, electronic or digital signals.

For example, the clutch arrangement is actuable responsive to the clutch arrangement being subjected to a rotational resistance from the respective electric motor module greater than a predetermined threshold.

A feature of at least one example of the presently disclosed subject matter is that the respective propulsion system assembly allows survival of the air vehicle and likewise continuation of the mission without changes in the form of flying of the air vehicle.

A feature of at least one example of the presently disclosed subject matter is that the respective propulsion system assembly does not require full engine shutdown in the event that one or more electric engine module malfunctions. Rather, the remainder of the electric motor modules continue working to provide albeit reduced thrust for the respective propulsion system assembly. In turn, this reduced thrust avoids or minimizes the need to implement an aerodynamic plan that could otherwise be required for the purpose of compensating for the loss of an engine in the case of multi-engined aircraft in which there can be a significant thrust asymmetry as a result of such a loss.

A feature of at least one example of the presently disclosed subject matter is that the respective propulsion system assembly can provide weight saving and improved performance, as compared to a conventional electrical engine having the same design power rating.

A feature of at least one example of the presently disclosed subject matter is that the respective propulsion system assembly can provide redundancy in thrust requirements in conventional air vehicles, and also in VTOL air vehicles particularly in the critical phases of hover.

A feature of at least one example of the presently disclosed subject matter is that the respective propulsion system assembly can allow operation of the propulsion system assembly in the most efficient domain of performance of the propulsion system assembly, via selective operation of a different number of electric motor modules in each phase of the flight, for example: hover (including vertical take-off (VTO) and/or vertical landing (VL)), cruise, climbing and descent.

A feature of at least one example of the presently disclosed subject matter is that it is possible to design a respective propulsion system assembly, and staring with a single electric motor module "layer", additional "layers" (each comprising a single electric motor module) can be added to the driveshaft according to the requirements of the specific air vehicle. In turn, this replaces the need to develop each time a new engine specific for the needs of each air vehicle. Thus, in at least some cases, additional electric motor modules can be added to the driveshaft without the need for drastic changes in the air vehicle.

A feature of at least one example of the presently disclosed subject matter is that it is possible to operate the propulsion system assembly in vectored thrust using all the electric motor modules thereof at maximum efficiency, and then use the same propulsion system in aerodynamic flight, when the power requirements are much lower (for example $\frac{1}{5}^{th}$ to $\frac{1}{10}^{th}$ or $\frac{1}{7}^{th}$ to $\frac{1}{10}^{th}$ of the vectored thrust power requirements) by decoupling most of the electric motor modules from the driveshaft, and only having a minimum number or a desired number of electric motor modules coupled to the driveshaft such as to provide the lower required power for aerodynamic flight, with each such coupled electric motor module operating at maximum efficiency. Accordingly, the propulsion system assembly can be operated in such a manner that each electric motor module that is coupled to the driveshaft operates at maximum efficiency, providing the air vehicle with greater endurance and/or range, as compared with a propulsion system in the form of a single electric motor that provides the maximum power for vectored thrust, but needs to operate at the lower power ratings for aerodynamic flight at lower engine efficiency (with losses which could be at for example 10% to 20% in efficiency) because the whole motor is being used each time.

A feature of at least one example of the presently disclosed subject matter is that the clutch arrangement allows the propulsion system assembly to continue operating even where there is a catastrophic failure of one of the electric motor modules (for example the coils burn out), by decoupling the electric motor module and thereby eliminating an otherwise undesired load on the driveshaft, which thereby allow the remaining electric motor modules to provide shaft power to the propeller (or other rotor design), for example.

A feature of at least one example of the presently disclosed subject matter is that the stacked configuration of the electric motor modules, as well as the disc-like form thereof, provide a compact design. In at least some cases, a compact design for the propulsion system assembly minimizes obscuring of the propeller (or other rotor design) by the propulsion system assembly, and thus maximizes the thrust produced by the propeller. In at least some cases, a compact design for the propulsion system assembly minimizes weight, for example by avoiding the need for a complex and heavy transmission system including gears, for example, providing instead direct motor-to-driveshaft coupling.

A feature of at least one example of the presently disclosed subject matter is that there is provided a versatile and compact design for a propulsion system assembly, the design also being relatively easy to implement and to adapt to changing needs and requirements, for a relatively low investment in time, effort and resources required for implementation.

A feature of at least one example of the presently disclosed subject matter is that there is provided a modular design for a propulsion system assembly, configured for meeting changing power demands for the propulsion system.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Figure 1:
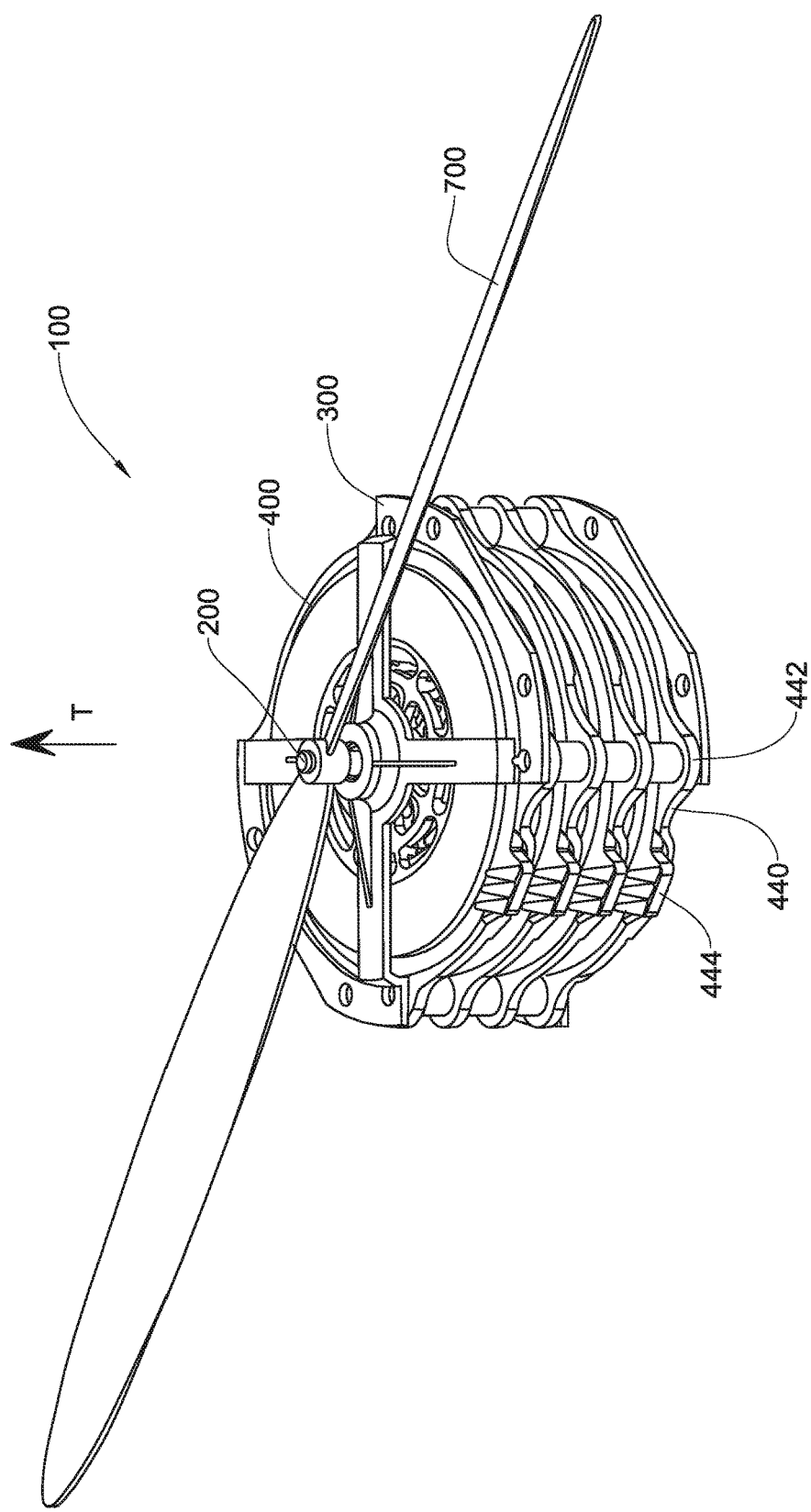
FIG. 1 is an isometric view of a propulsion system assembly according to an example of the presently disclosed subject matter.
Figure 2:
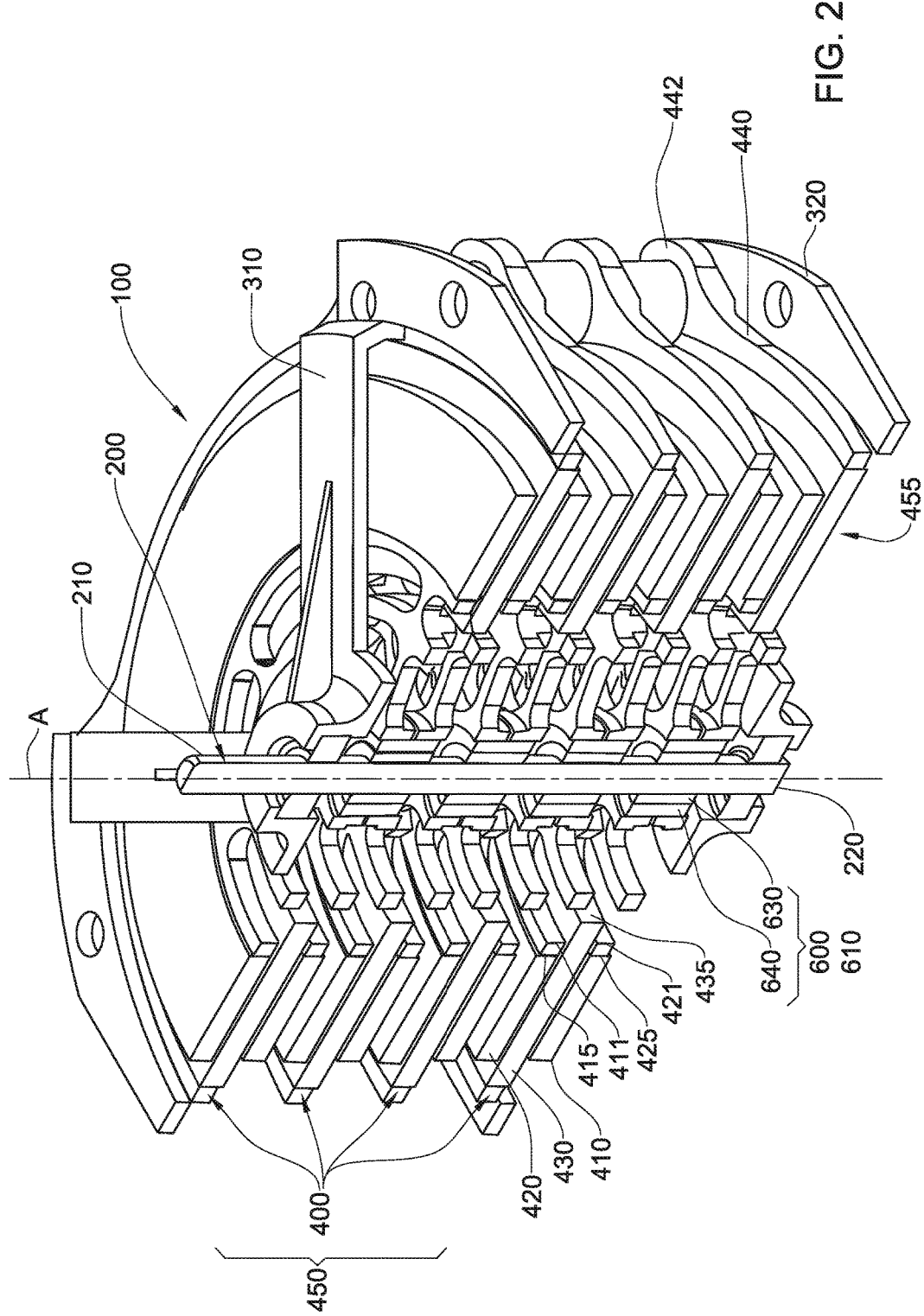
FIG. 2 is an isometric cross-sectional view of the example of FIG. 1.
Figure 3:
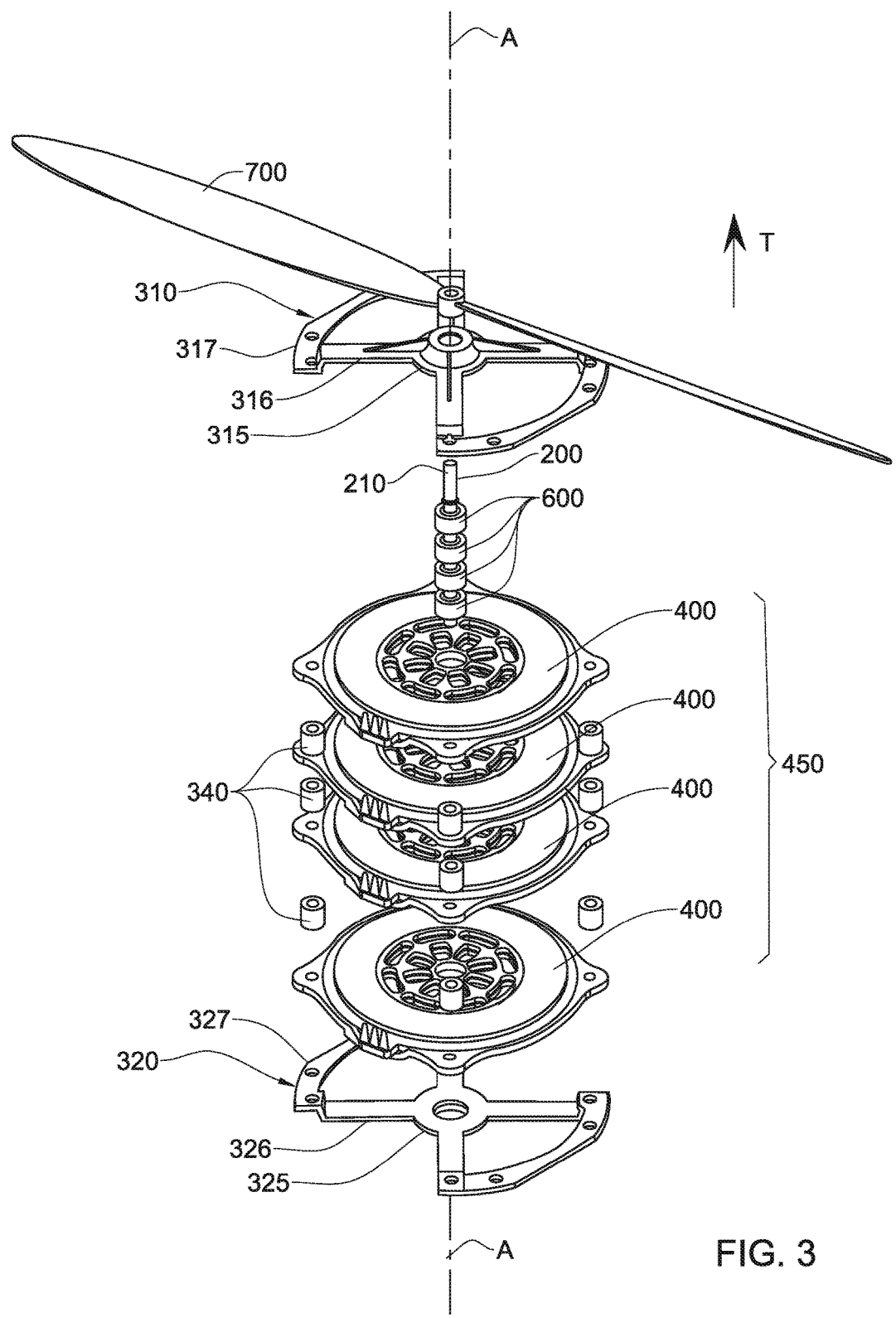
FIG. 3 is an isometric exploded view of the example of FIG. 1.

Referring to FIGS. 1 to 3, a propulsion system assembly according to a first example of the presently disclosed subject matter, generally designated 100, comprises a driveshaft 200, casing 300, and a plurality of electric motor modules (EMM) 400.

Referring to FIG. 2 in particular, each EMM 400 comprises in this example a first rotor 410 and a second rotor 420 sandwiching a stator 430 therebetween, and thus the first rotor 410 and the second rotor 420 are disposed one each on opposite facing sides of the stator 430.

The stator 430 is annular disc-shaped having a central opening 435, and includes a mounting ring 440 at the outer periphery thereof, the mounting ring 440 comprising a plurality of mounting points 442 as well as an electrical interface 444 including electrical inlet and/or outlet connection for providing electrical power to the EMM 400. The electrical interface 444 can also provide control inputs for controlling the EMM 400 and/or sensor outputs.

The first rotor 410 and the second rotor 420 are each disc-shaped having a respective central opening 415, 425 respectively, and are concentric with the stator 430, being co-axially aligned with the drive axis A of the driveshaft 200. Each one of said first rotor 410 and the second rotor 420 comprises a rotor mounting bracket, 411, 421 respectively, that inwardly project into the respective central opening 415, 425, and axially connect with one another via said central opening 435 to provide a rotor assembly 455.

Figure 4A:
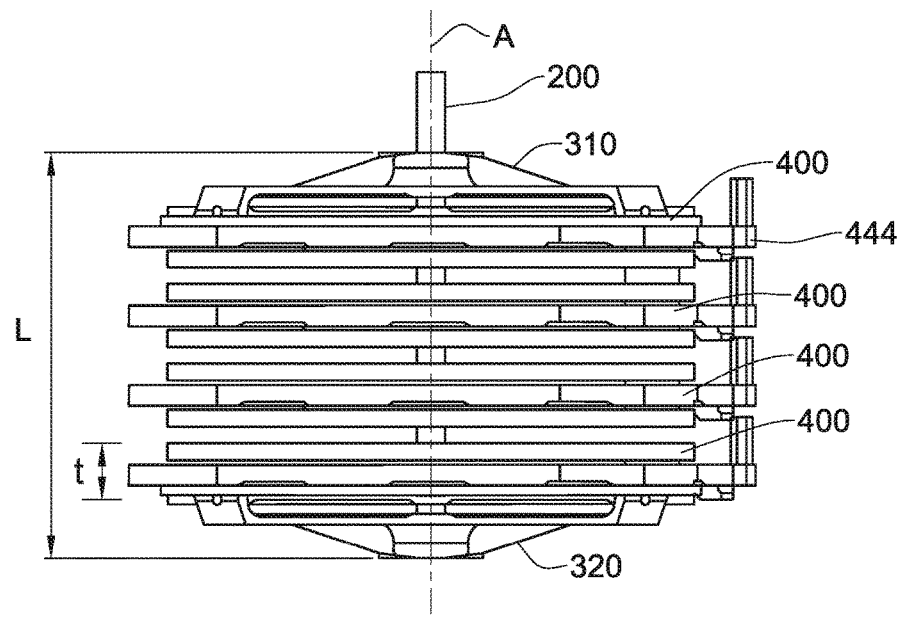
FIG. 4(a) is side view of the example of FIG. 1.
Figure 4B:
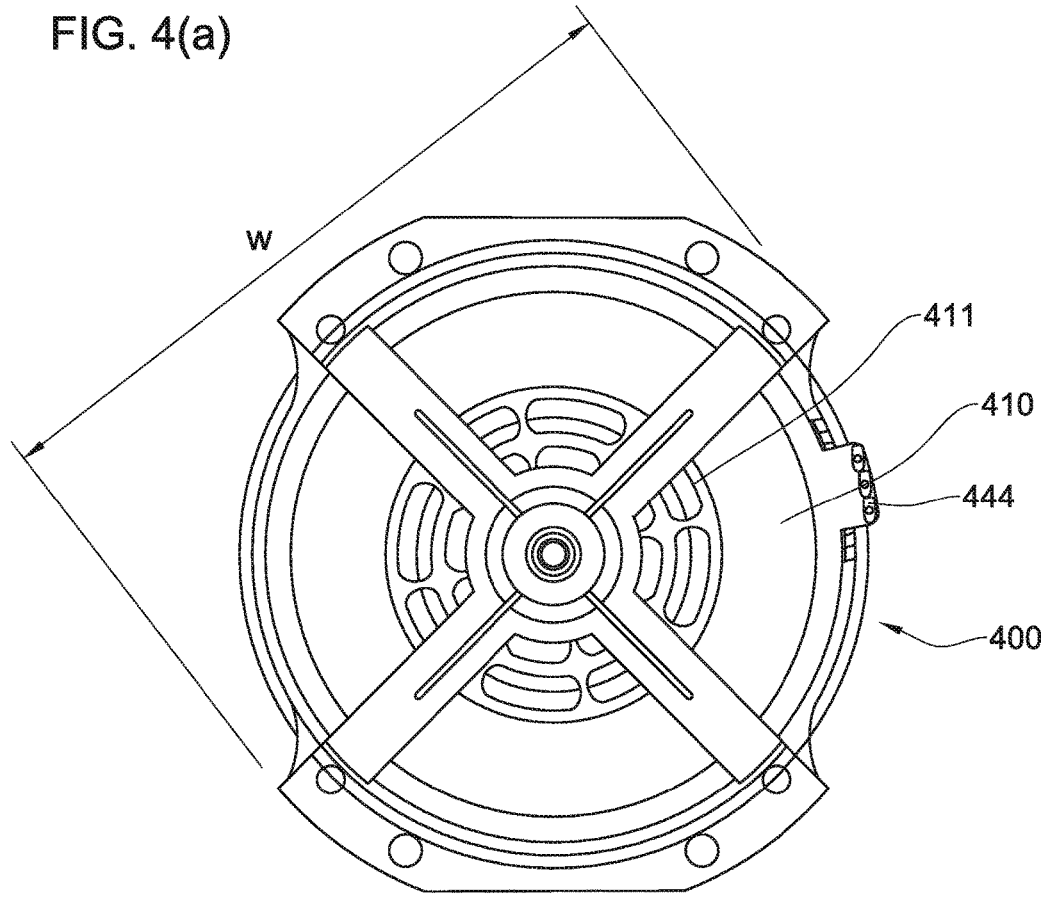
FIG. 4(b) is top view of the example of FIG. 1.

As best seen in FIG. 4(a) and FIG. 4(b), each EMM 400 is generally disc-shaped and has a depth dimension t (parallel to the drive axis A) and a width dimension W (orthogonal to the drive axis A). At least in the illustrated example, the width dimension W is greater than the depth dimension t, and while in the illustrated example, the ration R of the width dimension W to the depth dimension t is about 10, in alternative variations of this example the ratio R can have other suitable values, for example greater than 10, or within the range 5 to 20, for example.

In at least one implementation of this example, each EMM 400 can be a brushless coreless Axial-Flux motor, provided by Albus Technologies Ltd, of Israel, and/or an electric machine as disclosed in WO 2014/033715 or in WO 2014/033716 to Albus Technologies Ltd, for example.

Each EMM 400 comprises a respective controllable clutch arrangement 600 that is concentric with, and fixed to, the rotor assembly 415. The clutch arrangement 600 is configured for selectively coupling and decoupling the respective EMM 400 with respect to the driveshaft 200, enabling and disabling, respectively the transmission of torque/shaft power between the respective EMM 400 and the driveshaft 200, as will become clearer herein.

In this example, each clutch arrangement 600 is in the form of an electromechanical clutch 610 that is independently actuable with respect to the other clutch arrangements 600 of the other EMM 400 of the stack 450. Referring to FIG. 2 in particular, each clutch arrangement 600 comprises an armature 630 rotationally fixed to the driveshaft 200, and a clutch rotor 640 concentrically provided on the rotor assembly 455 and including a field coil (not shown). In response to actuation of the clutch arrangement 600, the clutch rotor 640 frictionally abuts the armature 630, and thus becomes mechanically connected to the driveshaft 200, thereby enabling transmission of torque/shaft power between the respective EMM 400 and the driveshaft 200. In this example, for each EMM 400, the respective clutch arrangement 600 is actuable responsive to one or more of electric, electronic or digital signals, as will become clearer herein. Thus, when the clutch arrangement is actuated, electrical current flows through the field coil, generating a magnetic field and magnetizing the clutch rotor 640, which in turn magnetically attracts the armature, abutting the armature to the clutch rotor 630 and generating friction. Thus, as the rotor assembly 455 spins about drive axis A, the drive shaft 200 becomes frictionally coupled via the armature, and thus shaft power is transmitted to the driveshaft 200 via the armature 630. The clutch arrangement 600 decouples the rotor assembly 455 from the driveshaft 200 when electrical current to the clutch arrangement 600 is stopped—the armature 630 is free to turn with the driveshaft 200, while the armature remains with the rotor assembly 455. Thus if a fault develops in the respective EMM 400 causing the EMM 400 to slow down or stop, the clutch arrangement 600 decouples that particular EMM 400 from the driveshaft 200, which is driven by the remaining EMM 400 of the stack 450.

In alternative variations of this example, other different clutch configurations can be used in place of the electromechanical clutch 610, for example an electromagnetic clutch arrangement or a mechanical clutch arrangement. For example, such a mechanical clutch arrangement can comprise a shaft clutch part rotationally fixed to the driveshaft 200, and a clutch rotor 640 concentrically provided on the rotor assembly 455, and including a release-type ball-detent type arrangement, in which spring loaded balls keep the shaft clutch part engaged with the shaft clutch part until the clutch arrangement is subjected to a torque overload, for example as a result of malfunction of the respective EMM 400 which for some reason is not developing torque and is now being rotated by the driveshaft. At torque overload conditions, the springs that abut the balls to one or another of the shaft clutch part engaged or the shaft clutch part becomes compressed, bringing the balls into disengagement with the other one of the shaft clutch part engaged or the shaft clutch part, respectively, allowing relative rotation between the driveshaft and the malfunctioning EMM 400.

In this example, the plurality of electric motor modules (EMM) 400 comprises four EMM 400 in axially stacked relationship with one another respect to the drive axis A, thereby defining an electric motor module stack (EMMS) 450. As will become clearer herein, in alternative variations of this example, or indeed in at least some implementations of this example, the EMMS 450 can have more than one EMM 400, i.e., two, three, five or more than five EMM 400, in axially stacked relationship with one another respect to the drive axis A.

In this example, all the EMM 400 in the EMMS 450 are essentially identical to one another, and each EMM 400 is designed to provide the same torque and same module design shaft power (DSP) for the EMM 400 as the other EMM 400. For example, the module design shaft power for each EMM 400 can be 40 kW or more than 40 kW. In other examples, the module design shaft power for each EMM 400 can be less than 40 kW, for example 10 kW, 15 kW, 20 kW, 25 kW, 30 kW, or 35 kW, or any power level in-between these values.

Each EMM 400 is configured for transmitting torque/shaft power to the driveshaft 200, when coupled thereto via the respective clutch arrangement 600, independently of at least one other EMM 400 or independently of operation of all the other EMM 400 of the stack 450.

The driveshaft 200 is rotatably mounted to the casing 300 about drive axis A. The driveshaft comprises a first shaft end 210 and a second shaft end 220, the first shaft end 210 and the second shaft end 220 being at opposite longitudinal ends of the driveshaft 200.

Referring also to FIG. 3, the casing 300 comprises a first casing bracket 310 affixed to one longitudinal end of the stack 450, and a second casing bracket 320 affixed to the opposed longitudinal end of the stack 450. More particularly, the first casing bracket 310 affixed to the EMM 400 that is closest to said first shaft end 210, and the second casing bracket 320 is affixed to the EMM 400 that is closest to the second shaft end 220.

The first casing bracket 310 comprises a first bearing arrangement 315, and radial arms 316 outwardly project therefrom to an outer base element 317 which is fixed to the uppermost EMM 400 as seen in FIG. 3.

The second casing bracket 320 comprises a second bearing arrangement 325, and radial arms 326 outwardly project therefrom to an outer base element 327 which is fixed to the lowermost EMM 400 as seen in FIG. 3.

The driveshaft 200 is rotatably mounted with respect to the first bearing arrangement 315 and the second bearing arrangement 325.

In the aforementioned axially stacked relationship, each pair of axially adjacent EMM 400 are fixedly connected to one another via the casing 300. For this purpose, the casing 300 further comprises a plurality of spacer elements 340 interconnecting each pair of axially adjacent EMM 400 in a fixed spatial relationship in stack 450.

Figure 5A:
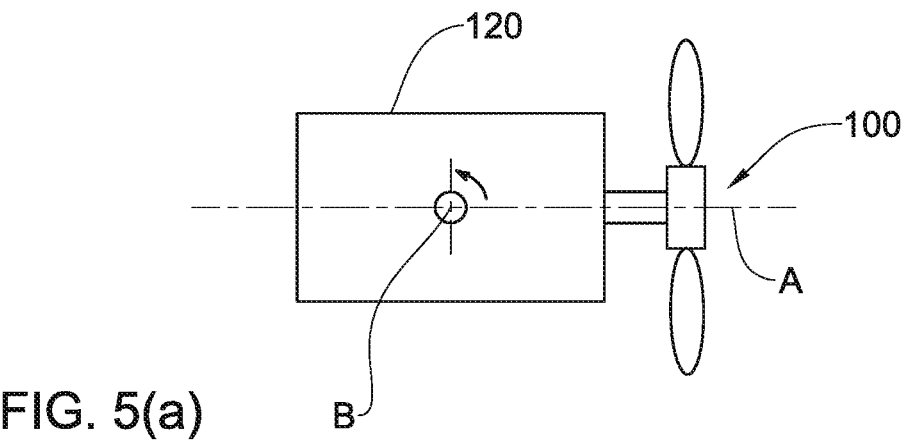
FIG. 5(a) schematically illustrates in side view an alternative variation of the example of FIG. 1 in horizontal thrust mode.
Figure 5B:
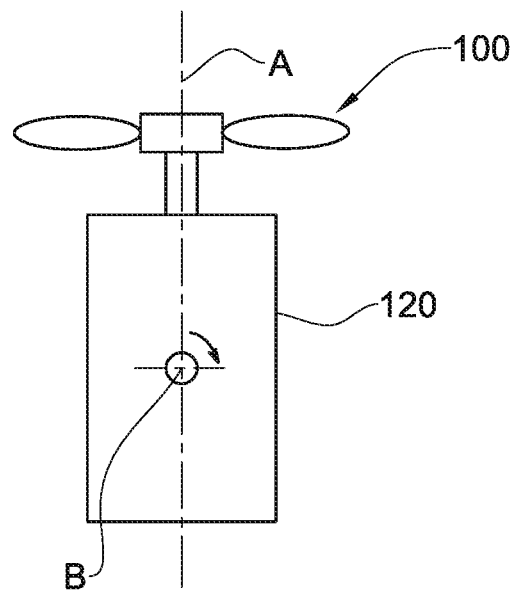
FIG. 5(b) schematically illustrates in side view the example of FIG. 5(a) in vertical thrust mode.

While in this example, the stack 450 is exposed to the external environment, in alternative variations of this example, and referring to FIG. 5(*a*) and FIG. 5(*b*), the propulsion system assembly 100 comprises a housing member 120 for enclosing therein at least the casing 300 and stack 450. In the illustrated example, the housing member 120 is configured for pivoting about a pivot axis B different from the drive axis A; in particular, in this example the pivot axis B is orthogonal to the drive axis A, and thus in one mode of operation the example illustrated in FIG. 5(*a*) and FIG. 5(*b*) can be used for generating a vertical thrust and a horizontal thrust, respectively, as the housing 120 together with the propulsion system assembly 100 is pivoted 90° about pivot axis B.

The propulsion system assembly 100 further comprises a first rotor element 700 for aerodynamically generating a thrust T1 responsive to being turned about the drive axis A by the EMM 400 of the propulsion system assembly 100. The first rotor element 700 is affixed to the first shaft end 210. While in this example the first rotor element 700 is in the form of a propeller, other forms of rotor can be provided in alternative variations of this example, for example a ducted fan or an unducted fan.

Figure 6A:
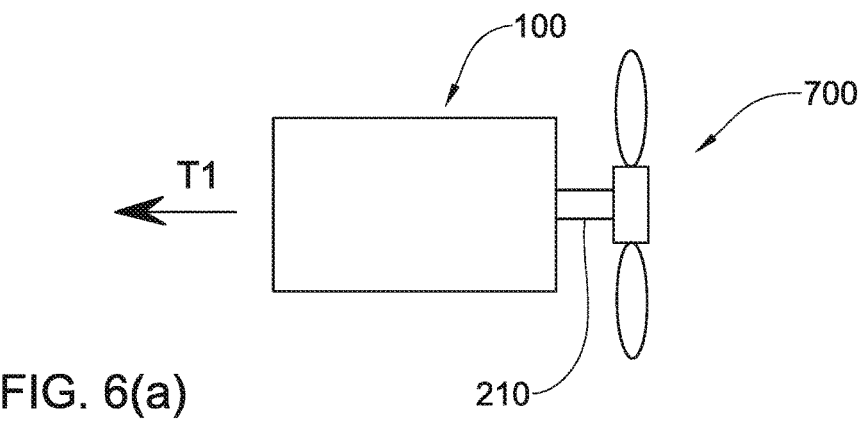
FIG. 6(a) schematically illustrates in side view the example of FIG. 1 configured with a pusher propeller.
Figure 6B:
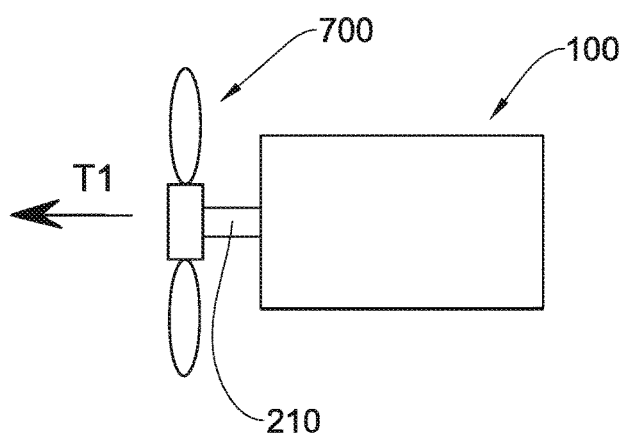
FIG. 6(b) schematically illustrates in side view the example of FIG. 1 configured with a puller propeller.
Figure 6C:
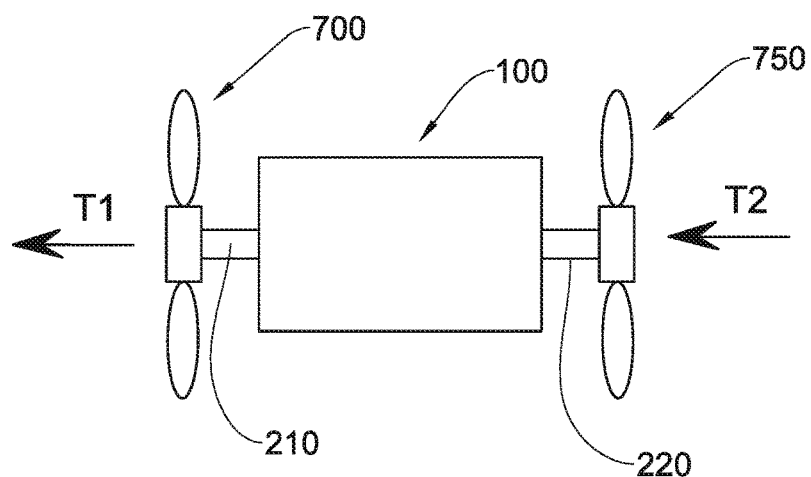
FIG. 6(c) schematically illustrates in side view an alternative variation of the example of FIG. 1 configured with a pusher propeller and a puller propeller.

Referring to FIGS. 6(*a*) and 6(*b*), the rotor element 700 can be configured as a pusher propeller or a puller propeller, respectively, for example.

In yet other alternative variations of these examples, and referring to FIG. 6(*c*), the propulsion system assembly 100 further comprises a second rotor element 750 for aerodynamically generating a second thrust T2 in the same direction as, and concurrently with, thrust T1, responsive to being turned about the drive axis A by the EMM 400 of the propulsion system assembly 100, and thus the second rotor element 750 is affixed to the second shaft end 220. The second rotor element 750 can comprise any one of a propeller, ducted fan, unducted fan, for example.

Figure 7:
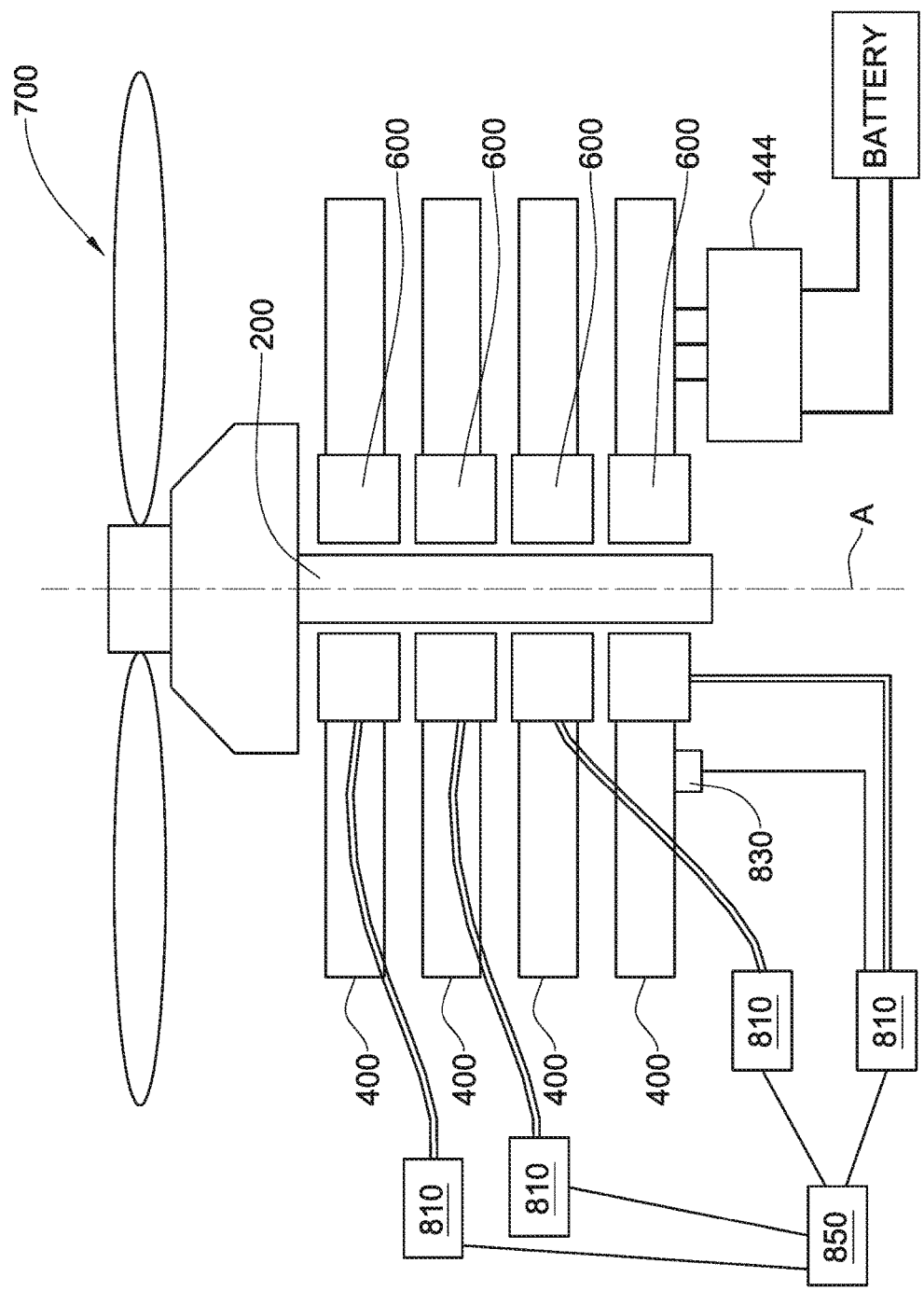
FIG. 7 schematically illustrates a control system for the example of FIG. 1.

Referring to FIG. 7, the propulsion system assembly 100 further comprises a control system 800 for controlling operation of each EMM 400. The control system 800 comprises a motor controller 810 for each EMM 400. Each respective motor controller 810 is configured for operating the respective clutch arrangement 600, to cause the respective clutch arrangement 600 to selectively couple or decouple the respective EMM 400 with respect to the driveshaft 200, according to predetermined criteria. In this example, such criteria include decoupling the respective EMM 400 with respect to the driveshaft 200 responsive to a detectable fault being detected in the respective EMM 400. For example, such a detectable fault can comprise a significant reduction in the shaft power generated by the respective EMM 400, as compared with an expected or nominal shaft power level. The control system 800 comprises a detector 830 (only shown for one EMM 400) for detecting such a detectable fault using suitable decision-making algorithms, the detector 830 being operatively connected to the control system 800, in particular to the respective motor controller 810.

Such decision-making algorithms can provide control outputs, based on input received from one or more known sensors, for controlling operation of the respective EMM 400. Such sensors can include, for example, one or more of Hall effect Sensors, Encoders, Resolvers, or combination of part or all of these. Additionally or alternatively, such sensors can include temperature sensors. The sensors are configured for providing the required data at a sufficiently high frequencies that are high enough to detect abnormal behavior of the respective EMM 400, and thus analyzing the data from those sensors by the respective motor controller 810 can indicating a problem in a specific EMM 400. Accordingly, the respective malfunctioning EMM 400 can be stopped, while concurrently allowing the other EMM 400 in the stack 450 to continue rotating the driveshaft at the required RPM. In at least some examples, this can require designing the propulsion system assembly 100 so that the power requirements for the total number of EMM 400 will allow less than this number of EMM 400 (for example one less) to supply adequate power for the air vehicle (in which the propulsion system assembly 100 is installed) in all the stages of aerodynamic flight, as well in all stages of vectored flight for cases in which the air vehicle is a VTOL air vehicle.

Each motor controller 810 is configured for operating independently of at least one other motor controller 810, and in this example independently of all the other motor controllers 810 of the control system 800.

The control system 800 also comprises a master controller 850 for controlling operation of the plurality of motor controllers 810, corresponding to the plurality of EMM 400. Essentially, the master controller 850 operates to monitor the behavior of all the EMM 400, to analyze the performance of each EMM 400, to analyze the operation of each motor controller 810, and to compare the performance and operation of all the EMM 400. The master controller 850 further operates to determine, from the information gathered in this manner, whether any particular EMM 400 in the stack 450 is behaving in a different or abnormal manner from the other EMM 400 in the stack 450. In such a case the master controller 850 can operate to stop or start EMM 400 directly, even if the respective motor controller 810 fails. In such cases where one EMM 400 no longer generates torque and is decoupled from the driveshaft 200, the remaining coupled EMM 400 compensate for the decoupled EMM 400 and will attempt to meet the required RPM for the driveshaft, wherein each respective motor controller 810 will operate to increase the demand for current and thus enable the coupled EMM 400 to operate at an increased power rating to develop the required shaft power.

For example, if a malfunction causes a particular EMM 400 to run at a higher RPM than the other EMM 400 in the stack, the motor controller 810 will attempt to match the RPM to that of the other EMM 400, and if not possible then will shut down the particular EMM 400, and the respective clutch arrangement 600 decouples the malfunctioning EMM 400 from the driveshaft.

For example, if a malfunction causes particular EMM 400 to run at a lower RPM than the other EMM 400 in the stack, the motor controller 810 or the master controller 850 will attempt to match the RPM to that of the other EMM 400, and if not possible then will shut down the particular EMM 400, and the respective clutch arrangement 600 decouples the malfunctioning EMM 400 from the driveshaft. Alternatively, even if the respective motor controller 810 fails, and/or the master controller 850 fails, the clutch arrangement 600 will automatically decouple the malfunctioning EMM 400 from the driveshaft 200 when the RPM is sufficiently lower than that of the driveshaft 200.

Thus, for example, the control system 800 can be operated to monitor operation of each EMM 400 and to actuate each the respective clutch arrangement 600 to selectively decouple the respective EMM 400 from the driveshaft 200 responsive to a detectable fault being detected in operation of the respective EMM 200.

The above example of the propulsion system assembly 100 can be used, by itself or in addition to other propulsion system assemblies 100 and/or other propulsion units, to power an air vehicle (e.g., a fixed wing air vehicle or a rotary wing air vehicle, for example a helicopter), or indeed other types of vehicles, including for example any one of: a hovercraft, land vehicle, sea surface vehicle, undersea vehicle. For example, the air vehicle can be a conventional air vehicle or a VTOL type air vehicle, and furthermore, the air vehicle can be a manned air vehicle or an unmanned air vehicle (UAV).

Figure 8:
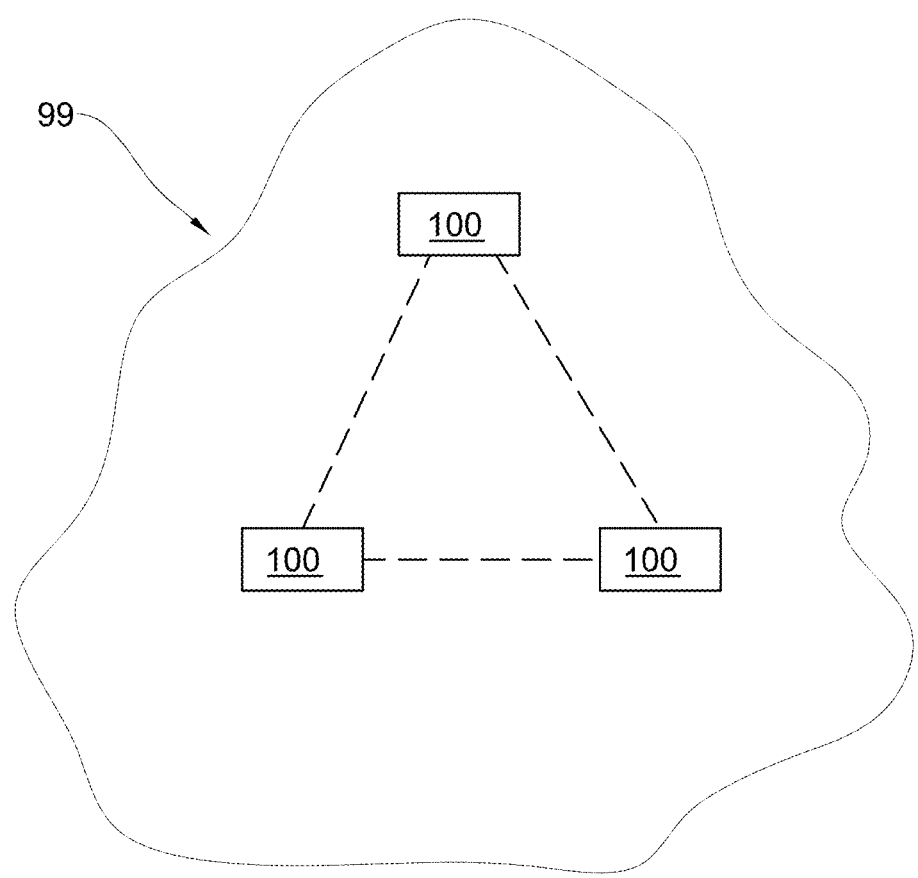
FIG. 8 schematically illustrates an example of an air vehicle configured with three tiltable propulsion system assemblies in triangular configuration in plan view.

For example, and referring for example to FIG. 8, the air vehicle 99 can be configured with three tiltable propulsion system assemblies 100 in triangular configuration in plan view.

The design aggregate shaft power generated by the propulsion system assembly 100 is essentially the sum of the module design shaft powers generated by each of the EMM 400 (minus some losses as a result of coupling the EMM 400 to the driveshaft 200). Thus, to meet the requirement of providing a particular design aggregate shaft power, the propulsion system assembly 100 comprises at least the appropriate number of EMM 400 which together can provide or exceed this design aggregate shaft power. In this example, the stack 450 comprises at least one additional EMM 400 than is required to provide the design aggregate shaft power, so as to provide a safety margin in case correspondingly one or more EMM 400 fail, so that the remaining operating EMM 400 can together provide the design aggregate shaft power. At the same time, it is to be noted that by disengaging the EMM 400 that develop a fault, the driveshaft does not turn the malfunctioning EMM 400, and thus there are no significant power losses that would otherwise be incurred for turning the malfunctioning EMM 400.

It is also readily evident that the propulsion system assembly 100 provides a very versatile propulsion system that can be modified for different air vehicles and even for different mission requirements for the same air vehicle.

For example, starting with propulsion system assembly 100 including a particular number of EMM 400 developing a particular a design aggregate shaft power, such a propulsion system assembly 100 can be modified when the design aggregate shaft power needs to be modified. For example, if the design aggregate shaft power needs to be increased or decreased, the number of EMM 400 provided in the stack

450 is correspondingly increased or decreased. Thus the sum of the module design shaft powers of the new number of EMM 400 matches or exceeds the modified design aggregate shaft requirement.

Thus, by adding additional EMM 400 to the stack 450, the shaft power output of the thus modified propulsion system assembly 100 is increased as compared with the unmodified said propulsion system assembly 100. Conversely, by removing at least one EMM 400 from stack 450 thereby decreases the shaft power output of the thus modified propulsion system assembly 100 as compared with the unmodified propulsion system assembly 100.

In this manner, the power output of the propulsion system assembly 100 can be changed dramatically in a simple manner, and optimizes every time the weight of the propulsion system assembly 100 by not having to carry additional engine weight when less power output is required.

According to an aspect of the presently disclosed subject matter, the propulsion system assembly 100 provides a very versatile propulsion system that can be modified for different power requirements of the air vehicle even during a particular mission while operating at maximum efficiency.

For example, starting with propulsion system assembly 100 including a fixed number of EMM 400 developing a particular a design aggregate shaft power, this aggregate shaft power can be chosen as that required for vectored thrust flight while operating all the EMM 400 of the stack 450 at maximum efficiency. Operation of such a propulsion system assembly 100 can be modified when the design aggregate shaft power needs to be changed. For example, the design aggregate shaft power needs to be significantly decreased when in aerodynamic flight such as for example cruising. In such a case, the number of EMM 400 in the stack 450 that are coupled to the driveshaft is correspondingly decreased, such that the sum of the module design shaft powers (each corresponding to maximum efficiency) of the EMM 400 that remained coupled to the driveshaft 200 matches or exceeds the modified design aggregate shaft requirement for aerodynamic flight.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:

1. A propulsion system assembly, comprising:
    a driveshaft rotatably mounted to a casing about a drive axis, the driveshaft comprising a first shaft end and an opposite facing second shaft end;
    a plurality of electric motor modules in axially stacked relationship with one another with respect to the drive axis to define an electric motor module stack, said plurality being an integer greater than unity, each electric motor module being configured for transmitting a torque to the driveshaft when coupled thereto independently of at least one other said electric motor module;
    each electric motor module comprising a controllable clutch arrangement for selectively coupling and decoupling the respective electric motor module with respect to the driveshaft to respectively enable and disable transmission of torque between the respective electric motor module and the driveshaft; and
    wherein said propulsion system assembly is reversibly tiltable between a horizontal angular disposition for providing horizontal thrust and a vertical angular disposition for providing vertical thrust.

2. The propulsion system assembly according to claim 1, wherein at least one of the following applies to the propulsion system assembly:
    wherein each said electric motor module comprises: a stator element; and a rotor element rotatably mounted with respect to the stator element, and configured for being reversibly coupled to the drive shaft via the respective clutch arrangement;
    wherein each electric motor module has a depth dimension parallel to the drive axis and a width dimension orthogonal to the drive axis, wherein said width dimension is greater than said depth dimension;
    wherein each electric motor module has a depth dimension parallel to the drive axis and a width dimension orthogonal to the drive axis, wherein said width dimension is greater than said depth dimension, and wherein a ratio of said width dimension to said depth dimension is between 5 and 20, or wherein a ratio of said width dimension to said depth dimension is greater than 10;
    wherein each said electrical motor module is designed to generate the same torque under the same operating conditions as one another;
    wherein each said electrical motor module is designed to generate a module design shaft power of 40 kW or more than 40 kW;
    wherein said propulsion system assembly is configured to provide a design shaft power using all said electric motor modules, wherein said design shaft power is greater than a required shaft power by a shaft power safety margin, wherein said shaft power safety margin is not less than a module design shaft power of at least one said electric motor module; and
    wherein for each electric motor module, the respective clutch arrangement comprises an electromechanical clutch independently actuable with respect to the other said clutch arrangements.

3. The propulsion system assembly according to claim 2, wherein for each electric motor module, the respective clutch arrangement comprises:
    a clutch rotor and a field coil concentrically provided on the rotor element, and
    an armature affixed to the driveshaft,
    wherein responsive to actuation of the respective clutch arrangement the clutch rotor frictionally abuts the armature driveshaft to enable transmission of said torque between the respective electric motor module and the driveshaft.

4. The propulsion system assembly according to claim 1, wherein at least one of the following applies to the propulsion system assembly:
    wherein for each electric motor module, the respective clutch arrangement is actuable responsive to one or more of electric, electronic or digital signals;
    wherein for each electric motor module, the respective clutch arrangement is actuable responsive to the clutch arrangement being subjected to a rotational resistance from the respective electric motor module greater than a predetermined threshold;

further comprising a first rotor element for aerodynamically generating a first thrust responsive to being turned about said drive axis by the propulsion system assembly;

further comprising a first rotor element for aerodynamically generating a first thrust responsive to being turned about said drive axis by the propulsion system assembly, and, wherein said first rotor element is affixed to said first shaft end;

further comprising a first rotor element for aerodynamically generating a first thrust responsive to being turned about said drive axis by the propulsion system assembly, and, wherein said first rotor element comprises any one of a propeller, ducted fan, unducted fan.

5. The propulsion system assembly according to claim 1, further comprising a second rotor element for aerodynamically generating a second thrust responsive to being turned about said drive axis by the propulsion system assembly, wherein at least one of the following applies to the propulsion system assembly:

wherein said second rotor element is affixed to said second shaft end;

wherein said second rotor element is affixed to said second shaft end, and, wherein said second rotor element comprises any one of a propeller, ducted fan, unducted fan.

6. The propulsion system assembly according to claim 1, wherein at least one of the following applies to the propulsion system assembly:

wherein the casing comprises a first casing bracket affixed to a first said electric motor module that is closest to said first shaft end, and a second casing bracket affixed to a second said electric motor module that is closest to said second shaft end, said first casing bracket comprising a first bearing arrangement and said second casing bracket comprising a second bearing arrangement, the driveshaft being rotatably mounted with respect to said first bearing arrangement and said second bearing arrangement;

wherein in said axially stacked relationship, each pair of axially adjacent said electric motor modules are fixedly connected to one another;

wherein said electric motor modules are connected to the casing in fixed spatial relationship in said axially stacked relationship;

wherein said casing comprises a plurality of spacer elements interconnecting each pair of axially adjacent electric motor modules in fixed spatial relationship in said axially stacked relationship.

7. The propulsion system assembly according to claim 1, further comprising a housing member for enclosing therein at least said casing and said plurality of electric motor modules, wherein at least one of the following applies to the propulsion system assembly:

wherein said housing member is configured for pivoting about a pivot axis different from the drive axis;

wherein said housing member is configured for pivoting about a pivot axis different from the drive axis, and, wherein said pivot axis is orthogonal to the drive axis.

8. The propulsion system assembly according to claim 1, further comprising a control system for controlling operation of each said electric motor module.

9. The propulsion system assembly according to claim 8, wherein at least one of the following applies to the propulsion system assembly:

wherein said control system comprises a motor controller for each said electric motor module, each respective motor controller being configured for operating each respective said clutch arrangement to cause the respective said clutch arrangement to selectively couple and decouple the respective said electric motor module with respect to the driveshaft;

wherein said control system comprises a motor controller for each said electric motor module, each respective motor controller being configured for operating the respective said clutch arrangement to cause the respective said clutch arrangement to selectively couple and decouple the respective said electric motor module with respect to the driveshaft, and, wherein each said motor controller is configured for operating the respective said clutch arrangement to decouple the respective said electric motor module with respect to the driveshaft responsive to a detectable fault being detected in the respective said electric motor module;

wherein said control system comprises a motor controller for each said electric motor module, each respective motor controller being configured for operating the respective said clutch arrangement to cause the respective said clutch arrangement to selectively couple and decouple the respective said electric motor module with respect to the driveshaft, and, wherein each said motor controller is configured for operating the respective said clutch arrangement to decouple the respective said electric motor module with respect to the driveshaft responsive to a detectable fault being detected in the respective said electric motor module, and, wherein said detectable fault comprises a significant reduction in the shaft power generated by the respective said electric motor module as compared with an expected shaft power level;

wherein said control system comprises a motor controller for each said electric motor module, each respective motor controller being configured for operating the respective said clutch arrangement to cause the respective said clutch arrangement to selectively couple and decouple the respective said electric motor module with respect to the driveshaft, and, wherein each said motor controller is configured for operating the respective said clutch arrangement to decouple the respective said electric motor module with respect to the driveshaft responsive to a detectable fault being detected in the respective said electric motor module, and, the propulsion system assembly comprising a detector for detecting said detectable fault, said detector being operatively connected to the control system;

wherein said control system comprises a motor controller for each said electric motor module, each respective motor controller being configured for operating the respective said clutch arrangement to cause the respective said clutch arrangement to selectively couple and decouple the respective said electric motor module with respect to the driveshaft, and, wherein each said motor controller is configured for operating the respective said clutch arrangement to decouple the respective said electric motor module with respect to the driveshaft responsive to a detectable fault being detected in the respective said electric motor module, and, wherein said detectable fault comprises a significant reduction in the shaft power generated by the respective said electric motor module as compared with an expected shaft power level, and, the propulsion system assembly comprising a detector for detecting said detectable fault, said detector being operatively connected to the control system;

wherein said control system comprises a motor controller for each said electric motor module, each respective motor controller being configured for operating the respective said clutch arrangement to cause the respective said clutch arrangement to selectively couple and decouple the respective said electric motor module with respect to the driveshaft, and, wherein each said motor controller is configured for operating the respective said clutch arrangement to decouple the respective said electric motor module with respect to the driveshaft responsive to a detectable fault being detected in the respective said electric motor module, and, wherein said detectable fault comprises a significant reduction in the shaft power generated by the respective said electric motor module as compared with an expected shaft power level, and, the propulsion system assembly comprising a detector for detecting said detectable fault, said detector being operatively connected to the control system, and, wherein said detector comprises at least one of Hall effect Sensors, Encoders, Resolvers;

wherein each said motor controller is configured for operating independently of at least one other said motor controller;

wherein said control system comprises a master controller for controlling operation of the plurality of said motor controllers corresponding to said plurality of electric motor modules.

10. An air vehicle comprising at least one propulsion system assembly as defined in claim 1.

11. The air vehicle according to claim 10, wherein the air vehicle is any one of: a VTOL type air vehicle, a manned air vehicle, an unmanned air vehicle (UAV).

12. The air vehicle according to claim 10, comprising three said propulsion system assemblies.

13. The air vehicle according to claim 12, wherein said three propulsion system assemblies are in triangular configuration when viewed in plan view.

14. The air vehicle according to claim 10, each said propulsion system assembly configured for selectively providing vertical thrust for vectored thrust flight and for selectively changing the thrust vector to provide horizontal thrust for aerodynamic flight.

15. A method for operating an air vehicle, comprising
providing a shaft power requirement for driving a desired rotor at desired operating conditions;
providing a propulsion system assembly as defined in claim 1, wherein each said electric motor module is designed to provide a module shaft power output at said desired operating conditions, wherein said integer is chosen such that a shaft power output of the stack, defined as a product of said integer and said module shaft power output, matches or exceeds said shaft power requirement.

16. The method according to claim 15, comprising modifying said shaft power requirement and correspondingly modifying said integer by increasing or decreasing said plurality of said electric motor modules such that a modified product of said modified integer and said module shaft power output matches or exceeds said modified shaft power requirement.

17. The method according to claim 15, further comprising at least one of the following:
adding additional said electric motor modules to said electric motor module stack to thereby increase said shaft power output of the thus modified propulsion system assembly as compared with the unmodified said propulsion system assembly;
removing at least one said electric motor modules from said electric motor module stack to thereby decrease said shaft power output of the thus modified propulsion system assembly as compared with the unmodified said propulsion system assembly.

18. The method according to claim 15, comprising monitoring operation of each said electric motor module and operating the respective said clutch arrangement thereof to decouple the respective said electric motor module from the driveshaft responsive to a detectable fault being detected in operation of the respective said electric motor module.

19. The method according to claim 15, wherein at least one of the following applies to the method:
wherein said shaft power requirement is determined for vectored thrust flight, and further comprising operating the propulsion system assembly in aerodynamic flight with a reduced number of electric motor modules coupled to the driveshaft, said reduced number being at least one less than said integer;
wherein said shaft power requirement is determined for vectored thrust flight, and further comprising operating the propulsion system assembly in aerodynamic flight with a reduced number of electric motor modules coupled to the driveshaft, said reduced number being at least one less than said integer, and, wherein each said electric motor module of said reduced number of electric motor modules operates at maximum efficiency during said aerodynamic flight;
wherein said shaft power requirement is determined for vectored thrust flight, and further comprising operating the propulsion system assembly in aerodynamic flight with a reduced number of electric motor modules coupled to the driveshaft, said reduced number being at least one less than said integer, and, wherein a ratio of said integer to said reduced number is between 5 and 10;
wherein said shaft power requirement is determined for vectored thrust flight, and further comprising operating the propulsion system assembly in aerodynamic flight with a reduced number of electric motor modules coupled to the driveshaft, said reduced number being at least one less than said integer, and, wherein each said electric motor module of said reduced number of electric motor modules operates at maximum efficiency during said aerodynamic flight, and, wherein a ratio of said integer to said reduced number is between 5 and 10.

20. A propulsion system assembly, comprising:
a driveshaft rotatably mounted to a casing about a drive axis, the driveshaft comprising a first shaft end and an opposite facing second shaft end;
a plurality of electric motor modules in axially stacked relationship with one another with respect to the drive axis to define an electric motor module stack, said plurality being an integer greater than unity, each electric motor module being configured for transmitting a torque to the driveshaft when coupled thereto independently of at least one other said electric motor module;
each electric motor module comprising a controllable clutch arrangement for selectively coupling and decoupling the respective electric motor module with respect to the driveshaft to respectively enable and disable transmission of torque between the respective electric motor module and the driveshaft;
wherein said propulsion system assembly configured for selectively providing vertical thrust for vectored thrust flight and for selectively changing the thrust vector to provide horizontal thrust for aerodynamic flight; and wherein said propulsion system assembly is reversibly tiltable between a horizontal angular disposition for providing horizontal thrust and a vertical angular disposition for providing vertical thrust.

21. A propulsion system assembly comprising:

a driveshaft rotatably mounted to a casing about a drive axis, the driveshaft comprising a first shaft end and an opposite facing second shaft end;

a plurality of electric motor modules in axially stacked relationship with one another with respect to the drive axis and co-axially aligned with the drive axis to define an electric motor module stack, said plurality being an integer greater than unity, each electric motor module being configured for transmitting a torque to the driveshaft when coupled thereto independently of at least one other said electric motor module;

each electric motor module comprising a controllable clutch arrangement for selectively coupling and decoupling the respective electric motor module with respect to the driveshaft to respectively enable and disable transmission of torque between the respective electric motor module and the driveshaft;

wherein said propulsion system assembly is configured for selectively providing vertical thrust for vectored thrust flight and for selectively changing the thrust vector to provide horizontal thrust for aerodynamic flight; and wherein the propulsion system assembly is configured for providing a first design aggregate shaft power corresponding to said vertical thrust, and for providing a second design aggregate shaft power corresponding to said vertical thrust, said second design aggregate shaft power being less than said first design aggregate shaft power, and wherein when providing said second design aggregate shaft power, a number of said electric motor modules that are coupled to the driveshaft is less than said integer, such that a sum of respective module design shaft powers of the electric motor modules that remained coupled to the driveshaft matches or exceeds the second design aggregate shaft requirement for aerodynamic flight.

\* \* \* \* \*